Feb. 5, 1946.                F. E. SWAIN                2,394,270
                            FLEXIBLE PIPE
                         Filed June 20, 1944
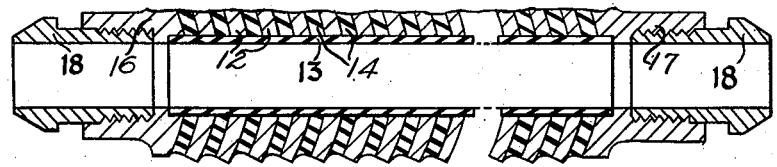
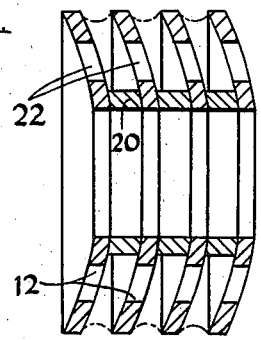
FIG.2.        FIG.3.
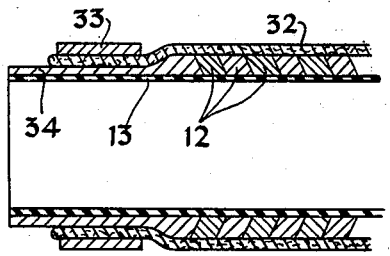
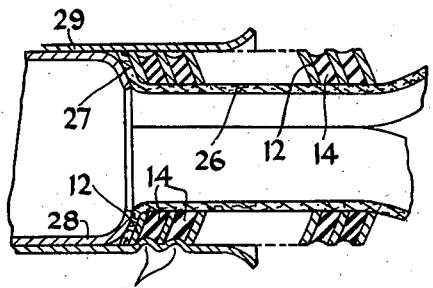
FIG.7.                        FIG.6.
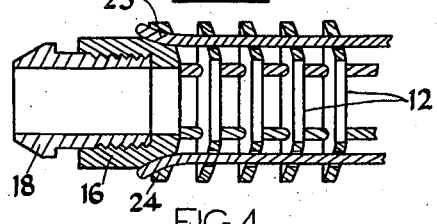
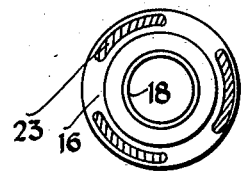
FIG.4.                        FIG.5.
Inventor
Frank E. Swain
by Mawhinney & Mawhinney
Attorneys Patented Feb. 5, 1946

2,394,270

UNITED STATES PATENT OFFICE 2,394,270

FLEXIBLE PIPE

Frank Edward Swain, Ewell, England

Application June 20, 1944, Serial No. 541,237
In Great Britain January 31, 1944

5 Claims. (Cl. 138—56)

This invention relates to a flexible pipe.

My main object is to provide an improved pipe of this kind for carrying hydraulic fluid at high pressures—i. e., a heavy-duty pipe.

A further object is to provide an improved pipe which may be used as an armoured covering for electric cables, transmission wires or the like.

A further object is to provide two such pipes which may be used at the ends of a shaft to provide therewith a constant-velocity, universal, torque-transmitting joint.

Various arrangements according to the invention are shown in the accompanying drawing in which—

Figure 1 is a sectional elevation of a preferred form of flexible pipe;

Figure 2 is a fragmentary sectional elevational view of a similar sort of pipe when partly flexed;

Figure 3 is a sectional elevational view of some of the rigid washers shown axially spaced from one another by rings;

Figure 4 is a similar view showing an alternative arrangement and also showing how the washers may be held in position, for example, during the moulding operation;

Figure 5 is an end elevation of Figure 4;

Figure 6 is a sectional elevation showing an alternative arrangement as applied to a flexible hose of a vacuum cleaner; and Figure 7 is a fragmentary sectional elevation of other arrangements.

Like reference numerals are applied throughout the various figures to denote similar parts as far as possible.

In Figure 1 the radially rigid washers 12, which may be of metal or of hard rubber or the like dependent upon the degree of strength which is required, are dished to be of part-spherical shape and their central openings receive and abut a rubber tube 13. Between each washer 12 is a dished rubber washer 14 both faces of which are adhered as by bonding to the adjacent faces of the washers 12. (The term "rubber" is used herein to include artificial or natural rubber, and products incorporating the same.) At the ends are sockets adaptors 16, 17 (which in this instance are shown as having screw-threaded bores to receive attachment nipples 18) provided with convex and concave surfaces, respectively, which are bonded to the end rubber washers 14.

Figure 2 indicates how the parts move when the pipe is slightly flexed, and in this example the rubber tube 13a is formed integrally with the rubber washers 14.

Thus, Figures 1 and 2 disclose a pipe which essentially comprises axially spaced rigid washers and interposed flexible washers held with both faces in contact with the adjacent rigid washers.

If desired, the rigid washers 12 may be axially spaced from one another by means of rigid rings 20, as shown by Figure 3, and when the washers are of metal these rings 20 if of brass or aluminium will provide an electric bond. (The rubber washers 14 and tube, 13, are omitted from Figure 3 for the sake of simplicity.)

The washers 12 (Figure 3) may be provided with openings 22 for lightening purposes. These openings, as will be seen from Figure 4, can receive a length of cord 23 passed up and down the pipe and through openings in the flanges 24 of the adaptors 16, 17. In this way the rigid washers 12 can be properly located whilst the rubber is being moulded in position, the cord being under tension. Thereafter, the cord can be withdrawn, if desired.

In an alternative arrangement, the spacing is effected substantially in the manner shown by Figure 4 but without the use of spacing rings 20 (as shown in Figure 3). The adaptors 16, 17 can then be relatively twisted to a desired extent, thereby shortening the distance between them and therefore the spacing of the washers 12 from one another. The cord 23 may, if desired, be of metal, and it may be left in position after the rubber moulding operation to provide an electric bond.

In a modification of this arrangement a stack of alternate flexible and rigid washers is built up and is lined with a rubber tube 13, and while the whole is subjected to axial compression the cable 23 is tightened and its ends are locked permanently together. On removal of the end load the flexible washers are left in compression, to make a fluid seal with the adjacent rigid washers, and the cable 23 is left in a state of tension.

In the construction of Figure 6, where no high internal pressure is to be withstood, the rubber tube 13 of Figure 1 is replaced by a canvas tube 26 the ends of which are flared, as shown at 27, and clamped between an end socket 28 and the adjacent rigid washer 12. The parts are further secured together by means of a sleeve 29 which is secured to the socket 28 and which has parts indented, as shown at 30, against the outer peripheries of the end rubber washers 14.

In the modification of Figure 7, all the washers 12 are part-spherical, radially-rigid washers which are slidingly supported against one another between an internal rubber tube 13 and an external canvas sleeve 32. The latter is clamped at its ends as shown by the clamping ring 33 engaging the end socket 34.

In the construction of Figure 8, instead of making use of radially-rigid washers I use a radially-rigid open spiral member 35, of which the inner periphery is engaged by the rubber ring 13, and adhered, as by bonding, between adjacent convolutions of the member 35 are the faces of a rubber spiral 36. Each convolution of the radially-rigid spiral is dished to be of part-spherical shape.

What I claim as my invention and desire to secure by Letters Patent of the United States is:

1. A flexible pipe which comprises axially spaced part-spherical rigid washers, interposed part-spherical flexible washers, and means holding the latter washers with both faces in contact with the adjacent rigid washers.

2. A flexible pipe comprising a rubber tube, axially spaced part-spherical rigid washers, and part-spherical rubber washers interposed between the rigid washers and bonded on both faces thereto, said rigid and rubber washers supporting said tube along its length.

3. A flexible pipe, according to claim 1, in which all the washers are correspondingly dished, the pipe having at its ends rigid adaptors with correspondingly-dished concave and convex faces, respectively, held in contact with the adjacent faces of the end flexible washers.

4. A flexible pipe comprising a rubber tube, axially spaced part-spherical rigid washers, part-spherical rubber washers interposed between the rigid washers, said washers supporting the tube along its length and all of the washers being correspondingly dished, end adaptors, and a length of cable passed up and down the pipe and through said end adaptors to hold said rubber washers in compression.

5. A flexible pipe which comprises axially spaced rigid means which are arcuate in cross section about the median line of the pipe, interposed flexible means of similar cross-section and similarly disposed, and means holding the rigid and flexible means with their adjacent faces in contact.

FRANK EDWARD SWAIN.